US012541327B2

(12) United States Patent
Sankaranarayanan et al.

(10) Patent No.: US 12,541,327 B2
(45) Date of Patent: Feb. 3, 2026

(54) STORING SEQUENTIAL AND RANDOM DATA IN DIFFERENT LAYOUTS

(71) Applicant: Micron Technology, Inc., Boise, ID (US)

(72) Inventors: Sundararajan Sankaranarayanan, Fremont, CA (US); Sampath Ratnam, San Jose, CA (US); Jiangang Wu, Milpitas, CA (US); Chandra Mouli Guda, Fremont, CA (US); Steven R. Brown, Boise, ID (US); Ashutosh Malshe, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/788,786

(22) Filed: Jul. 30, 2024

(65) Prior Publication Data
US 2025/0110669 A1   Apr. 3, 2025

Related U.S. Application Data

(60) Provisional application No. 63/541,960, filed on Oct. 2, 2023.

(51) Int. Cl.
G06F 3/06 (2006.01)

(52) U.S. Cl.
CPC .......... G06F 3/0659 (2013.01); G06F 3/061 (2013.01); G06F 3/0679 (2013.01); G06F 2212/7202 (2013.01)

(58) Field of Classification Search
CPC ...... G06F 3/0659; G06F 3/061; G06F 3/0679; G06F 2212/7202
See application file for complete search history.

(56) References Cited

U.S. PATENT DOCUMENTS

2015/0205718 A1\* 7/2015 Kida ................... G06F 12/0246
                                                           711/103
2019/0050353 A1\* 2/2019 Xu ......................... G06F 3/0658
2022/0300195 A1\* 9/2022 Bert ...................... G06F 3/0688

\* cited by examiner

Primary Examiner — Kalpit Parikh
(74) Attorney, Agent, or Firm — Schwegman Lundberg & Woessner, P.A.

(57) ABSTRACT

The disclosure configures a memory sub-system controller to store random data in a different layout from sequential data. The controller receives a request to store a set of data to a set of memory components. The controller determines whether the set of data corresponds to either sequential data or random data and selects a write cursor from a plurality of write cursors to associate with the set of data in response to determining whether the set of data corresponds to the sequential data or the random data. The controller programs the set of data to one or more of the set of memory components according to a data layout associated with the selected write cursor.

20 Claims, 6 Drawing Sheets

STORING SEQUENTIAL AND RANDOM DATA IN DIFFERENT LAYOUTS

PRIORITY APPLICATION

This application claims the benefit of priority to U.S. Provisional Application Ser. No. 63/541,960, filed Oct. 2, 2023, which is incorporated herein by reference in its entirety.

TECHNICAL FIELD

Examples of the disclosure relate generally to memory sub-systems and, more specifically, to providing adaptive media management for memory components, such as memory dies.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data on the memory components and to retrieve data from the memory components.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
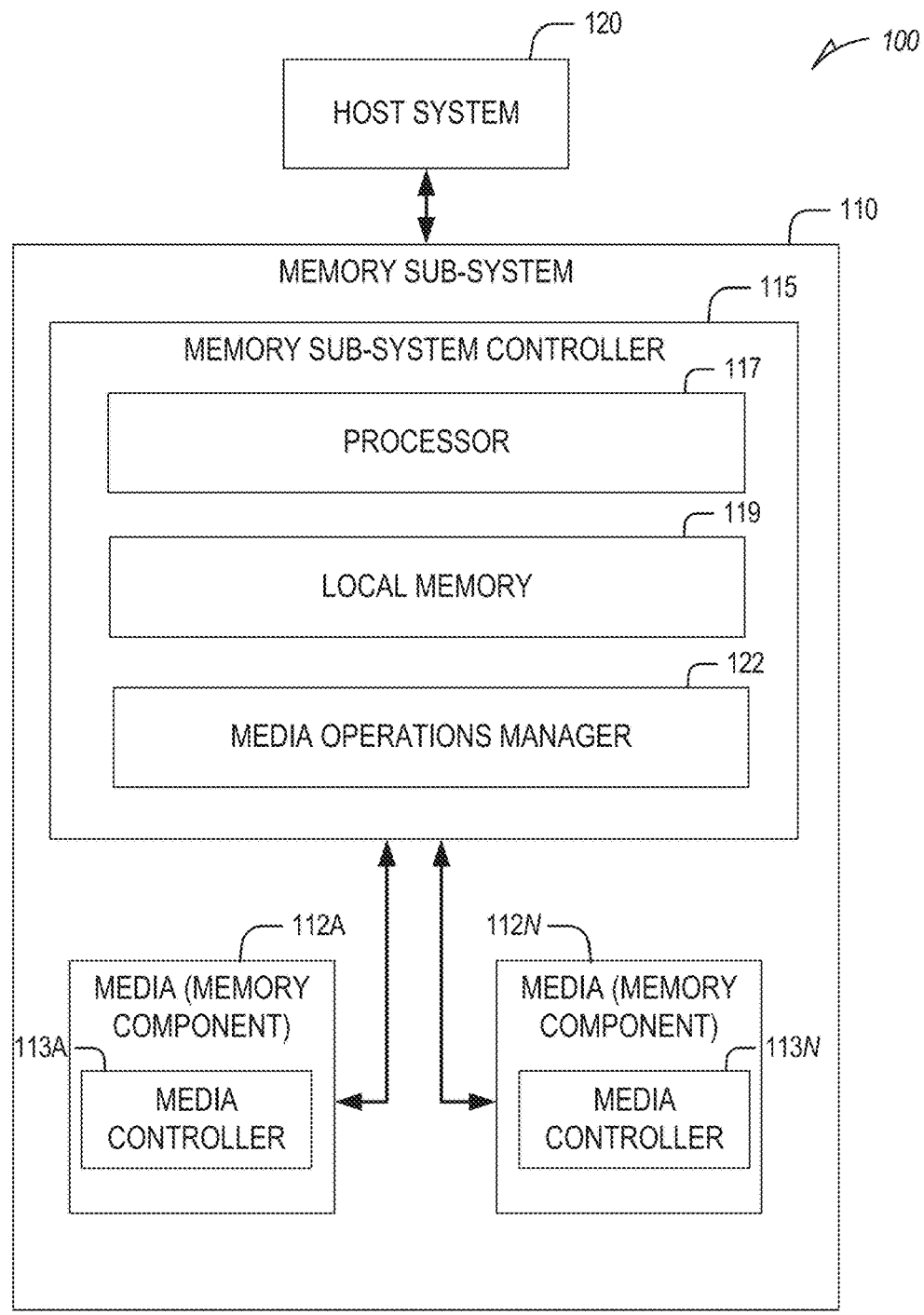
FIG. 1 is a block diagram illustrating an example computing environment including a memory sub-system, in accordance with some examples of the present disclosure.

Examples of the present disclosure configure a system component, such as a memory sub-system controller, to selectively store data in a first data layout or a second data layout based on whether that data is random or sequential. The controller can receive a request to store a set of data and can determine whether the set of data is sequential or random. The controller assigns a first write cursor to the data if the data is determined to be sequential and a second write cursor if the data is determined to be random. Each write cursor programs a respective collection of data to memory components in a different data layout. The data layout programmed by the first write cursor for sequential data can program sequential portions of the data across multiple dies and planes of those dies while the data layout programmed by the second write cursor for random data can program different portions (sequential or non-sequential) of the data across multiple planes of a single die (or fewer dies than those used for the sequential data). By programming sequential data across multiple dies, reading of such sequential data can be improved. Namely, the sequential data can be read faster and more efficiently because a greater amount of data can be read from multiple dies in parallel than the amount of sequential data that can be read from a single die. In this way, the controller can improve the storage and retrieval of data from the memory components and reduce latency.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices (e.g., memory dies or planes across multiple memory dies) that store data. The host system can send access requests (e.g., write command, read command) to the memory sub-system, such as to store data at the memory sub-system and to read data from the memory sub-system. The data (or set of data) specified by the host is hereinafter referred to as "host data," "application data," or "user data."

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data". "User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

Many different media management operations can be performed on the memory device. For example, the media management operations can include different scan rates, different scan frequencies, different wear leveling, different read disturb management, different near miss error correction (ECC), and/or different dynamic data refresh. Wear leveling ensures that all blocks in a memory component approach their defined erase-cycle budget at the same time, rather than some blocks approaching it earlier. Read disturb management counts all of the read operations to the memory component. If a certain threshold is reached, the surrounding regions are refreshed. Near-miss ECC refreshes all data read by the application that exceeds a configured threshold of errors. Dynamic data-refresh scans read all data and identify the error status of all blocks as a background operation. If a certain threshold of errors per block or ECC unit is exceeded in this scan-read, a refresh operation is triggered.

A memory device can be a non-volatile memory device. A non-volatile memory device is a package of one or more dice (or dies). Each die can be comprised of one or more planes. For some types of non-volatile memory devices (e.g., NAND devices), each plane is comprised of a set of physical blocks. For some memory devices, blocks are the smallest area than can be erased. Such blocks can be referred to or addressed as logical units (LUN). Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package.

Conventional memory sub-systems use the same data layout for storing data regardless of the type of data (e.g., regardless of whether the data is random or sequential). Namely, such memory sub-systems use the same write cursor and cache to store data across multiple dies or a single die. As a result, data is fragmented across the memory sub-system and random data can be interleaved with sequential data. This can result in wasted space and can slow down retrieval or reading such data. Namely, by interleaving different types of data, more memory blocks/pages need to be consumed to store a sequence of data, potentially across multiple rows/planes of multiple dies, which can require multiple reads to be performed to retrieve a given collection of sequential data. For example, a first read operation may need to be performed to retrieve one row of data across multiple dies, which can include random data. The retrieved row can include incomplete portions of a data sequence, which may require an additional read to be performed to read another row across the multiple dies to complete the missing portions of the data. This reduces the efficiency at which data is read/stored on the memory sub-systems. Namely, applying a one-size-fits-all approach to storing data is inefficient and may still result in poor read performance. This can slow down the overall memory sub-system and can prolong performing other operations, which introduces inefficiencies.

Examples of the present disclosure address the above and other deficiencies by providing a memory controller that can selectively store data in a first data layout or a second data layout based on whether that data is random or sequential. Specifically, the controller can receive a request to store a set of data and can assign a first write cursor to the data if the data is determined to be sequential and a second write cursor if the data is determined to be random. The data layout programmed by the first write cursor for sequential data can program sequential portions of the data across multiple dies and planes of those dies while the data layout programmed by the second write cursor for random data can program different portions (sequential or non-sequential) of the data across multiple planes of a single die (or fewer dies than those used for the sequential data). By programming sequential data across multiple dies, reading of such sequential data can be improved. Namely, the sequential data can be read faster and more efficiently because a greater amount of data can be read from multiple dies in a parallel than the amount of sequential data that can be read from a single die. Specifically, reading one row of sequential data from the multiple dies can provide a complete sequence of data that may exclude random data and can avoid the need to read additional rows of data to complete a sequence. This increases the overall efficiency of operating the memory sub-system.

In some examples, the memory controller receives a request to store a set of data to the set of memory components and determines whether the set of data corresponds to sequential data or random data. The memory controller selects a write cursor from a plurality of write cursors to associate with the set of data in response to determining whether the set of data corresponds to the sequential data or the random data. The memory controller programs the set of data to one or more of the set of memory components according to a data layout associated with the selected write cursor.

In some examples, a first write cursor of the plurality of write cursors corresponds to a first data layout and a second write cursor of the plurality of write cursors corresponds to a second data layout. In some cases, the first write cursor is selected in response to determining that the set of data corresponds to the sequential data and the second write cursor is selected in response to determining that the set of data corresponds to the random data. In some cases, the first write cursor stores a collection of data in a first queue having a first size before programming the collection of data on the one or more of the set of memory components. The second write cursor stores a second collection of data in a second queue having a second size before programming the second collection of data on the one or more of the set of memory components, the second size being smaller than the first size.

In some examples, the memory controller determines that an amount of data in the collection of data stored in the first queue corresponds to the first size. The memory controller, in response to determining that the amount of data in the collection of data stored in the first queue corresponds to the first size, programs the collection of data on multiple planes sequentially across multiple dies of the set of memory components. In some cases, the memory controller divides the collection of data for programming on the multiple planes such that a first row of the multiple planes across the multiple dies stores a first set of individual portions of the collection of data in sequence and a second row of the multiple planes across the multiple dies stores a second set of individual portions of the collection of data in sequence.

In some cases, a first portion of the second set of individual portions that is stored in a first plane of a first die of the multiple dies follows sequentially a second portion of the first set of individual portions that is stored in a last plane of a second die of the multiple dies. In some cases, a first group of data of the collection of data is stored in a plurality of rows across planes of the first die in parallel followed by storage, in parallel, of a second group of data of the collection of data in a plurality of rows across planes of the second die. In some cases, the collection of data stored in the first queue includes data from multiple threads each including a different sequence of data.

In some examples, the memory controller determines that an amount of data in the collection of data stored in the first queue fails to correspond to the first size. The memory controller computes an amount of time that one or more portions of the collection of data have been stored in the first queue and determines that the amount of time transgresses a maximum amount of time threshold. The memory controller, in response to determining that the amount of time transgresses the maximum amount of time threshold, pads the collection of data to match the first size. The memory controller, in response to determining that the amount of data in the collection of data that has been padded corresponds to the first size, programs the collection of data on multiple planes sequentially across multiple dies of the set of memory components.

In some examples, the memory controller determines that an amount of data in the second collection of data stored in the second queue corresponds to the second size. The memory controller, in response to determining that the amount of data in the second collection of data stored in the second queue corresponds to the second size, programs the second collection of data on multiple planes sequentially across a single die of the set of memory components. In some cases, the memory controller divides the second collection of data for programming on the multiple planes such that a first row of the multiple planes across the single die stores a first set of individual portions of the second collection of data in sequence and a second row of the multiple planes across the single die stores a second set of individual portions of the collection of data in sequence.

In some cases, a first portion of the second set of individual portions that is stored in a first plane of the single die follows sequentially a second portion of the first set of individual portions that is stored in a last plane of the single die. In some cases, the memory controller performs garbage collection on the set of data using an individual write cursor corresponding to a random data layout.

In some examples, the memory controller accesses configuration information associated with the set of memory components. The configuration information can indicate a first data layout for the sequential data and a second data layout for the random data. In some cases, the configuration information for the first data and second data layouts specifies a quantity of planes and quantity of dies across which to program the sequential and random data in sequence. In some examples, the first data layout includes a greater quantity of dies than the second data layout.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples of the present disclosure. The memory sub-system 110 can include media, such as memory components 112A to 112N (also hereinafter referred to as "memory devices"). The memory components 112A to 112N can be volatile memory devices, non-volatile memory devices, or a combination of such. The memory components 112A to 112N can be implemented by individual dies, such that a first memory component 112A can be implemented by a first memory die (or a first collection of memory dies) and a second memory component 112N can be implemented by a second memory die (or a second collection of memory dies). Each memory die can include a plurality of planes in which data can be stored or programmed. In some cases, the first memory component 112A can be implemented by a first SSD (or a first independently operable memory sub-system) and the second memory component 112N can be implemented by a second SSD (or a second independently operable memory sub-system).

In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system. The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components and/or storage devices. An example of non-volatile memory components include a negative-and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells. Each of the memory cells can store one or more bits of data (e.g., blocks) used by the host system 120. Although non-volatile memory components such as NAND-type flash memory are described, the memory components 112A to 112N can be based on any other type of memory, such as a volatile memory. In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative-or (NOR) flash memory, electrically erasable programmable read-only memory (EEPROM), and a cross-point array of non-volatile memory cells.

A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. For example, a single first row that spans a first set of the pages or blocks of the memory components 112A to 112N can correspond to or be grouped as a first block stripe, and a single second row that spans a second set of the pages or blocks of the memory components 112A to 112N can correspond to or be grouped as a second block stripe.

The memory sub-system controller 115 can communicate with the memory components 112A to 112N to perform memory operations such as reading data, writing data, or erasing data at the memory components 112A to 112N and other such operations. The memory sub-system controller 115 can communicate with the memory components 112A to 112N to perform various memory management operations, such as enhancement operations, different scan rates, different scan frequencies, different wear leveling, different read disturb management, garbage collection operations, different near miss ECC operations, and/or different dynamic data refresh.

The memory sub-system controller 115 can include hardware, such as one or more integrated circuits and/or discrete components, a buffer memory, or a combination thereof. The memory sub-system controller 115 can be a microcontroller, special-purpose logic circuitry (e.g., a field programmable gate array (FPGA), an application specific integrated circuit (ASIC), etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive commands or operations from the host system 120 and can convert the commands or operations into instructions or appropriate commands to achieve the desired access to the memory components 112A to 112N. In some examples, the commands or operations received from the host system 120 can specify configuration data for the memory components 112A to 112N. The configuration data can describe the lifetime (maximum) PEC values and/or reliability grades associated with different groups of the memory components 112A to 112N and/or different blocks within each of the memory components 112A to 112N. The configuration data can also include various manufacturing information for individual memory components of the memory components 112A to 112N. The manufacturing information can specify the reliability metrics/information associated with each memory component. The configuration data can also store information indicating a first data layout for the sequential data and a second data layout for the random data. The configuration information for the first data and second data layouts can specify a quantity of planes and quantity of dies across which to program the sequential and random data in sequence.

In some examples, the commands or operations received from the host system 120 can include a write/read command, which can specify or identify an individual memory component in which to program/read data. Based on the memory component specified by the write/read command, the memory sub-system controller 115 can program/read the data into/from one or more of the memory components 112A to 112N. The memory sub-system controller 115 can be responsible for other memory management operations, such as wear leveling operations, garbage collection operations, error detection and error-correcting code (ECC) operations, encryption operations, caching operations, and address translations. The memory sub-system controller 115 can further include host interface circuitry to communicate with the host system 120 via the physical host interface. The host interface circuitry can convert the commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which are raw memory devices combined with a local embedded controller (e.g., local media controllers) for memory management within the same memory device package. Any one of the memory components 112A to 112N can include a media controller (e.g., media controller 113A and media controller 113N) to manage the memory cells of the memory component (e.g., to perform one or more memory management operations), to communicate with the memory sub-system controller 115, and to execute memory requests (e.g., read or write) received from the memory sub-system controller 115.

The memory sub-system controller 115 can include a media operations manager 122. The media operations manager 122 can be configured to selectively store data in a first data layout or a second data layout based on whether that data is random or sequential. Specifically, the media operations manager 122 can receive a request to store a set of data and can assign a first write cursor to the data if the data is determined to be sequential and a second write cursor if the data is determined to be random. The data layout programmed by the first write cursor for sequential data can program sequential portions of the data across multiple dies and planes of those dies while the data layout programmed by the second write cursor for random data can program different portions (sequential or non-sequential) of the data across multiple planes of a single die (or fewer dies than those used for the sequential data). By programming sequential data across multiple dies, reading of such sequential data can be improved. Namely, the sequential data can be read faster and more efficiently because a greater amount of data can be read from multiple dies in a parallel than the amount of sequential data that can be read from a single die. This is because reading one row of sequential data from the multiple dies can provide a complete sequence of data that may exclude random data and can avoid the need to read additional rows of data to complete a sequence. This increases the overall efficiency of reading data from the memory sub-system 110.

Depending on the example, the media operations manager 122 can comprise logic (e.g., a set of transitory or non-transitory machine instructions, such as firmware) or one or more components that causes the media operations manager 122 to perform operations described herein. The media operations manager 122 can comprise a tangible or non-tangible unit capable of performing operations described herein. Further details with regards to the operations of the media operations manager 122 are described below.

Figure 2:
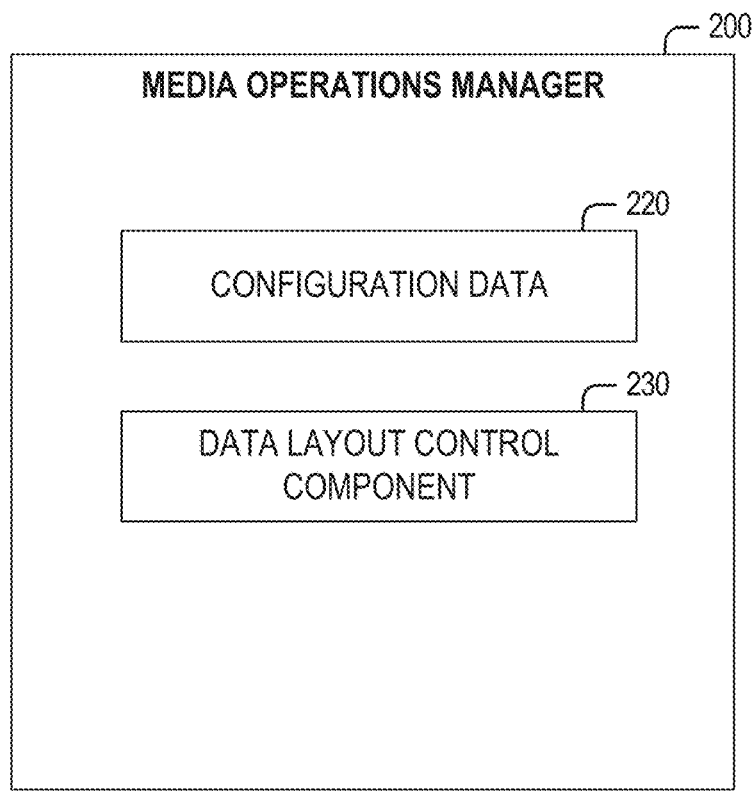
FIG. 2 is a block diagram of an example media operations manager, in accordance with some implementations of the present disclosure.

FIG. 2 is a block diagram of an example media operations manager 200 (corresponding to media operations manager 122 of FIG. 1), in accordance with some implementations of the present disclosure. As illustrated, the media operations manager 200 includes configuration data 220 and a data layout control component 230. For some examples, the media operations manager 200 can differ in components or arrangement (e.g., less or more components) from what is illustrated in FIG. 2.

The configuration data 220 accesses and/or stores configuration data associated with the memory components 112A to 112N of FIG. 1. In some examples, the configuration data 220 is programmed into the media operations manager 200. For example, the media operations manager 200 can communicate with the memory components 112A to 112N to obtain the configuration data 220 and store the configuration data 220 locally on the media operations manager 122. In some examples, the media operations manager 122 communicates with the host system 120 of FIG. 1. The host system 120 receives input from an operator or user that specifies parameters including virtual memory group assignments to physical memory components, lifetime (maximum) PEC values of different bins, groups, blocks, block stripes, memory dies, manufacturing information, reliability information, and/or confirmation information indicating different data layouts for sequential data and random data.

The media operations manager 122 can receive configuration data from the host system 120 and store the configuration data in the configuration data 220. The media operations manager 122 can update the configuration data for various memory components over time. The data layout control component 230 can receive a request to store a set of data to the memory components 112A to 112N. The data layout control component 230 can process the set of data to determine whether the set of data corresponds to sequential data or random data. The data layout control component 230 can then access the configuration data 220 to determine the data layout to use for the set of data based on whether the data is sequential or random.

Figure 3A:
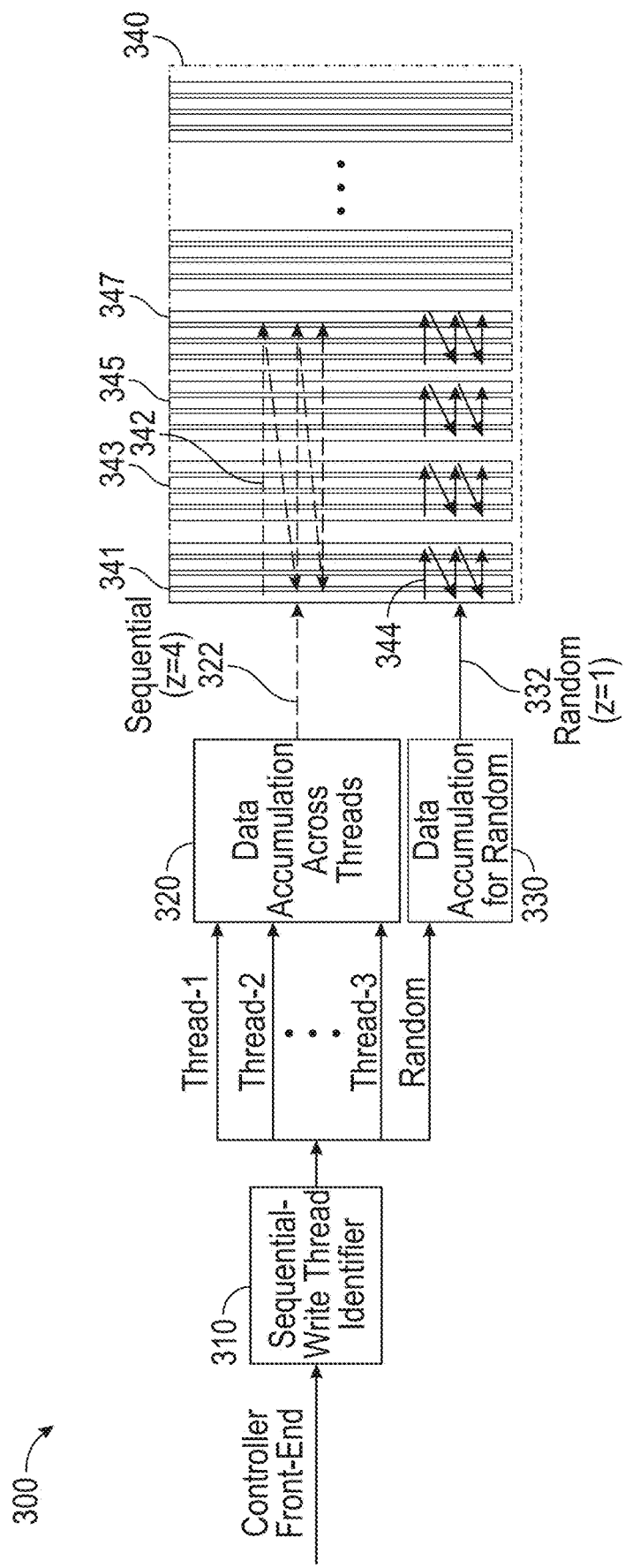
FIGS. 3A and 3B illustrate storage of data in different data layouts based on whether data is sequential or random, in accordance with some implementations of the present disclosure.

In some examples, the data layout control component 230 can be implemented using one or more of the components shown in diagram 300 of FIG. 3A. Specifically, the data layout control component 230 can include a sequential write thread identifier 310. The sequential write thread identifier 310 can process incoming data and determine whether that data is sequential or random. In response to determining that the incoming data is part of a thread corresponding to sequential data, the sequential write thread identifier 310 provides the incoming data to the sequential data accumulation component 320. In response to determining that the incoming data is part of a thread corresponding to random data, the sequential write thread identifier 310 provides the incoming data to the random data accumulation component 330.

The sequential data accumulation component 320 can store one or more sequential write cursors. Each of the sequential write cursors can be programmed to store data using the data layout specified by the configuration data 220 for sequential data. For example, in an n-die layout, such as where n equals 4 data layout (but can take on any other integer value greater than one, such as 4, 8, and so forth), each write cursor of the sequential data accumulation component 320 can store a collection of data 322 in a queue and store that sequential data from the queue into multiple planes of a set of dies 340 (e.g., four dies in case of a n=4 data layout). For example, the set of dies 340 can include a first die 341 which includes four planes, a second die 343 which includes four planes, a third die 345 which includes four planes, a fourth die 347 which includes four planes. The set of dies 340 can include many more dies than that used to store the collection of data. Namely, the set of dies 340 can include 20 dies but only a group of four dies (e.g., the first die 341, the second die 343, the third die 345, and the fourth die 347) can be used in a n=4 data layout to store the collection of sequential data from the sequential data accumulation component 320.

The random data accumulation component 330 can store a random write cursor. The random write cursor can be programmed to store data using the data layout specified by the configuration data 220 for random data. For example, in a n=1 data layout, each random write cursor of the random data accumulation component 330 can store a collection of random data 332 in a queue and store that random data from the queue into multiple planes of one die of the set of dies 340 (e.g., a single die in case of a n=1 data layout). For example, the random data accumulation component 330 can store the collection of random data 332 across multiple planes of the first die 341.

The sequential data accumulation component 320 can include a queue or cache (e.g., using SRAM) for storing a collection of data received from the sequential write thread identifier 310. The queue or cache can be of a specified size or can be assigned a specified size that corresponds to the quantity of data that is stored sequentially across the set of dies 340. For example, if the quantity of data that is stored sequentially across the set of dies 340 includes 48 pages, the size associated with the queue or cache can be at least 48 pages. Once the sequential data accumulation component 320 determines that the amount of data (e.g., size or quantity of data) of a collection of data stored currently in the queue corresponds to (matches or reaches or transgresses) the specified size, the sequential data accumulation component 320 can initiate transfer of the collection of data from the queue or cache to the set of dies 340.

In some examples, the sequential data accumulation component 320 can initiate a timer when a collection of data or a portion of the collection of data is initially loaded to and stored in the cache or queue of the sequential data accumulation component 320. The sequential data accumulation component 320 can compare the value of the timer to a maximum amount of time threshold (e.g., 1 hour). If the timer fails to transgress the maximum amount of time threshold, the sequential data accumulation component 320 can continue receiving and adding data to the cache or queue from the sequential write thread identifier 310 until the specified size is reached or met. In response to determining that the timer has transgressed the maximum amount of time threshold, the sequential data accumulation component 320 can determine how much empty space remains in the queue or cache by subtracting the specified size from the size currently occupied by data stored in the queue or cache. The sequential data accumulation component 320 can then pad or add dummy data amounting to the remaining queue or cache space to completely fill the queue or cache. Then, the sequential data accumulation component 320 can perform the operations to divide the collection of data and store the collection of data across planes of multiple dies of the set of dies 340.

As part of transferring the collection of data from the queue or cache to the set of dies 340, the sequential data accumulation component 320 divides the collection of data into separate groups. Each group represents a portion of the collection of data that is stored to an individual die of the set of dies 340. A first group of the collection of data can include a first portion of a first row of data stored across multiple planes 342 across multiple dies (e.g., the first die 341, the second die 343, the third die 345, and the fourth die 347) and a second portion of a second row of data stored across multiple planes 342 across the multiple dies (e.g., the first die 341, the second die 343, the third die 345, and the fourth die 347). The groups are arranged such that the first portion written to a first plane of the first die (e.g., plane 1 of the first die 341) follows in sequence and is adjacent in the sequence to the last portion written to the last plane of the last die (e.g., plane 4 of fourth die 347).

In some examples, the collection of data can include 48 pages. The 48 pages can be divided into multiple groups for storage across the first die 341, the second die 343, the third die 345, and the fourth die 347. A first row of the 48 pages can include the sequential pages including page 1 (P1), page 2 (P2), page 3 (P3), page 4 (P4) . . . page 16 (P16). P1, P2, P3, and P4 can be part of a first group that is written respectively to planes 1-4 of the first die 341. P5, P6, P7, and P8 can be part of a second group that is written respectively to planes 1-4 of the second die 343. P9, P10, P11, and P12 can be part of a third group that is written respectively to planes 1-4 of the third die 345. P13, P14, P15, and P16 can be part of a fourth group that is written respectively to planes 1-4 of the fourth die 347. In this way, the first row of the 48 pages includes 16 sequential pages that can all be read in parallel with a single read from each of the planes across the first die 341, second die 343, third die 345, and fourth die 347.

The first group can include a portion of a second row of the 48 pages that includes the sequential pages including page 17 (P17), page 18 (P18), page 19 (P19), group that also includes P1, P2, P3, and P4 that is written respectively to planes 1-4 of the first die 341. As such, the sequential data accumulation component 320 divides the collection of data such that the group of data written to the first die 341 is sequentially arranged across planes of the first die 341 but not sequentially arranged across rows of the first die 341. Namely, the page written to the first plane of the second row of the first die 341 does not sequentially follow the page written to the last plane of the first row of the first die 341.

The random data accumulation component 330 can include a queue or cache (e.g., using SRAM) for storing a collection of random data received from the sequential write thread identifier 310. The queue or cache can be of a specified size or can be assigned a specified size that corresponds to the quantity of data that is stored across planes of an individual die of the set of dies 340. For example, if the quantity of data that is stored across planes of the individual die of the set of dies 340 includes 12 pages, the size associated with the queue or cache can be at least 12 pages. Once the random data accumulation component 330 determines that the amount of data (e.g., size or quantity of data) of a collection of data stored currently in the queue corresponds to (matches or reaches or transgresses) the specified size, the random data accumulation component 330 can initiate transfer of the collection of data from the queue or cache to the set of dies 340.

Specifically, the random data accumulation component 330 can generate a group of data 344 to be stored across planes of the same die (e.g., the first die 341) sequentially. The random data accumulation component 330 can divide the group of data 344 such that the page written to a first plane of a second row of the first die 341 sequentially follows or is written immediately after the page written to a last plane of a first row of the first die 341. Namely, the random data accumulation component 330 can distribute random data across an individual die rather than across multiple dies since parallel reads of random data are unlikely to be performed. In some cases, the random data accumulation component 330 distributes the random data in a similar manner as the sequential data accumulation component 320 across multiple dies but the quantity of dies across which the random data is distributed is fewer or smaller than the quantity of dies across which the sequential data is distributed.

In some examples, because the random data accumulation component 330 programs data to fewer dies (e.g., a single die) than the sequential data accumulation component 320 (which stores across multiple dies, such as four dies), the size of the cache or queue of the random data accumulation component 330 can be smaller than the size of the cache or queue of the sequential data accumulation component 320. In such cases, the random data accumulation component 330 can write or program data to the set of dies 340 more frequently than the sequential data accumulation component 320. Namely, the random data accumulation component 330 may need to accumulate less data before writing to the set of dies 340 than the random data accumulation component 330.

In some examples, the data layout control component 230 can perform routine garbage collection operations using the data layout corresponding to the random data accumulation component 330 or a n=1 data layout. Namely, even though data may be part of a sequential set of data written by the sequential data accumulation component 320, such data blocks can be re-written during garbage collection to an individual die and not across multiple dies.

Figure 3B:
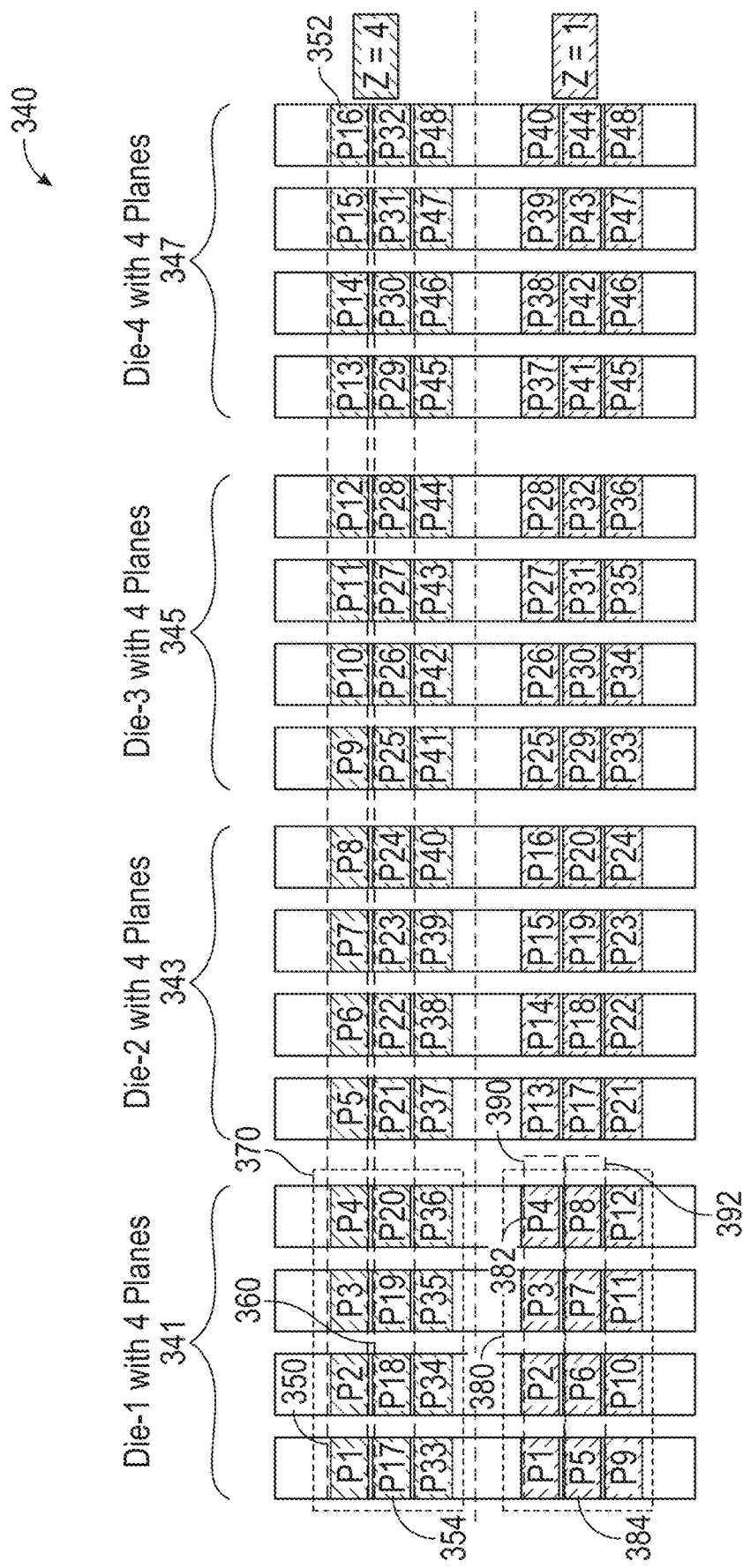

FIG. 3B illustrates storage of data in different data layouts based on whether data is sequential or random, in accordance with some implementations of the present disclosure. Specifically, the distribution and layout of sequential and random data across the set of dies 340 (e.g., the first die 341, the second die 343, the third die 345, and the fourth die 347) is shown in FIG. 3B.

In some cases, the sequential data accumulation component 320 generates a first group of data 370 for storage across multiple planes of the first die 341. The first group of data 370 can be generated by dividing the collection of data stored in the queue or cache of the sequential data accumulation component 320.

For example, the sequential data accumulation component 320 can divide the collection of data so that the collection of data is stored sequentially across multiple planes and dies. In some cases, collection of data includes pages P1-P48. In such cases, the sequential data accumulation component 320 can generate a first row of data 350 in which multiple sequential pages P1, P2, . . . and P16 are stored sequentially across each of the planes (planes 1-4) of the first die 341, the second die 343, the third die 345, and the fourth die 347. After the last page 352 (e.g., P16) is stored in the last plane (e.g., plane 4) of the last die (e.g., the fourth die 347), the sequential data accumulation component 320 stores a second row of the data 360. The second row of the data 360 stores multiple sequential pages P17, P18, . . . and P32 sequentially across each of the planes (planes 1-4) of the first die 341, the second die 343, the third die 345, and the fourth die 347. The sequential data accumulation component 320 arranges the rows such that the first page 354 (e.g., P17) written to the first plane (e.g., plane 1) of the first die 341 is sequentially adjacent to the last page 352 written to the last plane of the fourth die 347. The sequential data accumulation component 320 continues writing data in this manner until enough rows are written to cover the size of the collection of data. In some cases, the number of rows that are written is four to cover 48 pages. The first group of data 370 can include multiple rows of pages where pages within each row are sequentially adjacent to each other but pages in one row of a particular die are not sequentially adjacent to pages in another adjacent row of the particular die.

In some cases, the random data accumulation component 330 generates a group of random data 380 for storage across multiple planes of a single die (e.g., the first die 341). The group of random data 380 can be generated by dividing the collection of random data stored in the queue or cache of the random data accumulation component 330.

For example, the random data accumulation component 330 can divide the collection of random data so that the collection of random data is stored sequentially across multiple planes of a single die (or a quantity of dies fewer than the quantity of dies used to store sequential data by the sequential data accumulation component 320). In some cases, collection of data includes pages P1-P12. In such cases, the random data accumulation component 330 can generate a third row of data 390 in which multiple sequential pages P1, P2, P3, and P4 are stored sequentially across each of the planes (planes 1-4) of the first die 341. After the last page 382 (e.g., P4) is stored in the last plane (e.g., plane 4) of the first die 341, the random data accumulation component 330 stores a fourth row of the data 392. The fourth row of the data 392 stores multiple sequential pages P5, P6, P7, and P8 sequentially across each of the planes (planes 1-4) of the first die 341. The random data accumulation component 330 arranges the rows such that the first page 384 (e.g., P5) written to the first plane (e.g., plane 1) of the first die 341 is sequentially adjacent to the last page 382 written to the last plane of the same first die 341. The random data accumulation component 330 continues writing data in this manner until enough rows are written to cover the size of the collection of random data in the queue or cache. In some cases, the number of rows that are written is four to cover 12 pages. The group of random data 380 can include multiple rows of pages where pages within each row are sequentially adjacent to each other and one row of a particular die is sequentially adjacent to pages in another adjacent row of the particular die.

Figure 4:
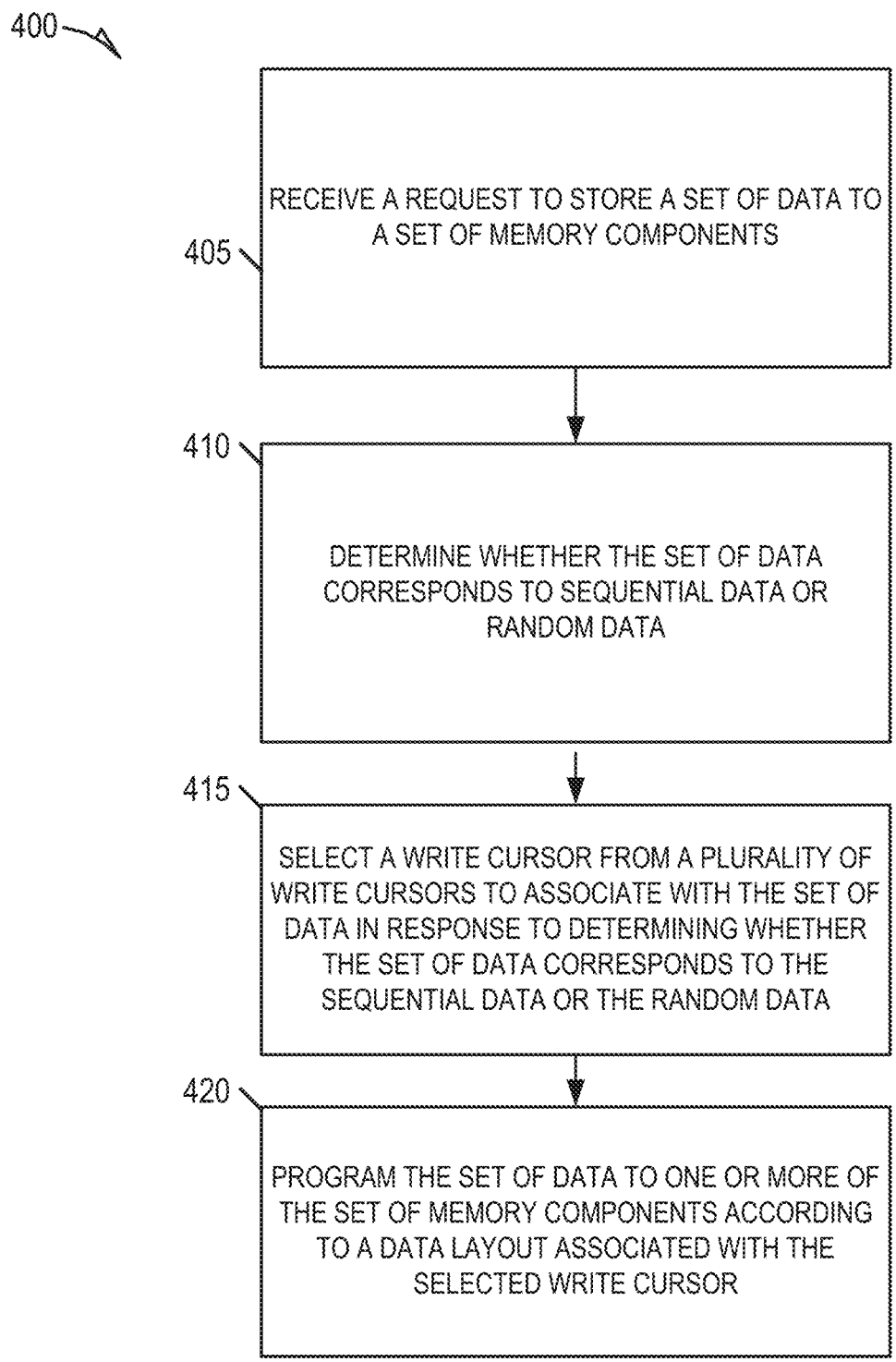
FIG. 4 is a flow diagram of an example method or process for a memory controller to program sequential data in a different data layout from random data, in accordance with some implementations of the present disclosure.

FIG. 4 is a flow diagram of an example method 400 (or process) to allow a memory controller to store sequential data in a different data layout from random data, in accordance with some implementations of the present disclosure. The method 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 400 is performed by the media operations manager 122 of FIG. 1. Although the processes are shown in a particular sequence or order, unless otherwise specified, the order of the processes can be modified. Thus, the illustrated examples should be understood only as examples, and the illustrated processes can be performed in a different order, and some processes can be performed in parallel. Additionally, one or more processes can be omitted in various examples. Thus, not all processes are required in every example. Other process flows are possible.

Referring now to FIG. 4, the method (or process) 400 begins at operation 405, with a media operations manager 122 of a memory sub-system (e.g., memory sub-system 110) receiving a request to store a set of data to a set of memory components. Then, at operation 410, the media operations manager 122 determines whether the set of data corresponds to sequential data or random data and, at operation 415, selects a write cursor from a plurality of write cursors to associate with the set of data in response to determining whether the set of data corresponds to the sequential data or the random data. At operation 420, the media operations manager 122 programs the set of data to one or more of the set of memory components according to a data layout associated with the selected write cursor.

In view of the disclosure above, various examples are set forth below. It should be noted that one or more features of an example, taken in isolation or combination, should be considered within the disclosure of this application.

Example 1: A system comprising: a set of memory components of a memory sub-system; and at least one processing device operatively coupled to the set of memory components, the at least one processing device being configured to perform operations comprising: receiving a request to store a set of data to the set of memory components; determining whether the set of data corresponds to either sequential data or random data; selecting a write cursor from a plurality of write cursors to associate with the set of data in response to determining whether the set of data corresponds to either the sequential data or the random data; and programming the set of data to one or more of the set of memory components according to a data layout associated with the selected write cursor. There may exist multiple sequential cursors each associated with a different thread. For example, thread one can be written to a first cursor and thread two can be written to a second cursor. Also, the assignments between threads and cursors can be dynamic and the number of threads/cursors can grow or shrink over time.

Example 2. The system of Example 1, wherein a first write cursor of the plurality of write cursors corresponds to a first data layout, and wherein a second write cursor of the plurality of write cursors corresponds to a second data layout.

Example 3. The system of Example 2, wherein the first write cursor is selected in response to determining that the set of data corresponds to the sequential data, and wherein the second write cursor is selected in response to determining that the set of data corresponds to the random data.

Example 4. The system of any one of Examples 2-3, wherein the first write cursor stores a collection of data in a first queue having a first size before programming the collection of data on the one or more of the set of memory components, and wherein the second write cursor stores a second collection of data in a second queue having a second size before programming the second collection of data on the one or more of the set of memory components, the second size being smaller than the first size.

Example 5. The system of Example 4, wherein the operations comprise: determining that an amount of data in the collection of data stored in the first queue corresponds to the first size; and in response to determining that the amount of data in the collection of data stored in the first queue corresponds to the first size, programming the collection of data on multiple planes sequentially across multiple dies of the set of memory components.

Example 6. The system of Example 5, wherein the operations comprise: dividing the collection of data for programming on the multiple planes such that a first row of the multiple planes across the multiple dies stores a first set of individual portions of the collection of data in sequence and a second row of the multiple planes across the multiple dies stores a second set of individual portions of the collection of data in sequence.

Example 7. The system of Example 6, wherein a first portion of the second set of individual portions that is stored in a first plane of a first die of the multiple dies follows sequentially a second portion of the first set of individual portions that is stored in a last plane of a second die of the multiple dies.

Example 8. The system of any one of Examples 6-7, wherein a first group of data of the collection of data is stored in a plurality of rows across planes of the first die in parallel followed by storage, in parallel, of a second group of data of the collection of data in a plurality of rows across planes of the second die.

Example 9. The system of any one of Examples 4-8, wherein the collection of data stored in the first queue includes data from multiple threads comprising different sequences of data.

Example 10. The system of any one of Examples 4-9, wherein the operations comprise: determining that an amount of data in the collection of data stored in the first queue fails to correspond to the first size; computing an amount of time that one or more portions of the collection of data have been stored in the first queue; determining that the amount of time transgresses a maximum amount of time threshold; in response to determining that the amount of time transgresses the maximum amount of time threshold, padding the collection of data to match the first size; and in response to determining that the amount of data in the collection of data that has been padded corresponds to the first size, programming the collection of data on multiple planes sequentially across multiple dies of the set of memory components.

Example 11. The system of any one of Examples 4-10, wherein the operations comprise: determining that an amount of data in the second collection of data stored in the second queue corresponds to the second size; and in response to determining that the amount of data in the second collection of data stored in the second queue corresponds to the second size, programming the second collection of data on multiple planes sequentially across a single die of the set of memory components.

Example 12. The system of Example 11, wherein the operations comprise: dividing the second collection of data for programming on the multiple planes such that a first row of the multiple planes across the single die stores a first set of individual portions of the second collection of data in sequence and a second row of the multiple planes across the single die stores a second set of individual portions of the collection of data in sequence.

Example 13. The system of Example 12, wherein a first portion of the second set of individual portions that is stored in a first plane of the single die follows sequentially a second portion of the first set of individual portions that is stored in a last plane of the single die.

Example 14. The system of any one of Examples 1-13, wherein the operations comprise: performing garbage collection on the set of data using an individual write cursor corresponding to a random data layout.

Example 15. The system of any one of Examples 1-14, wherein the operations comprise: accessing configuration information associated with the set of memory components, the configuration information indicating a first data layout for the sequential data and a second data layout for the random data.

Example 16. The system of Example 15, wherein the configuration information for the first data and second data layouts specifying a quantity of planes and quantity of dies across which to program the sequential and random data in sequence.

Methods and computer-readable storage medium with instructions for performing any one of the above Examples.

Figure 5:
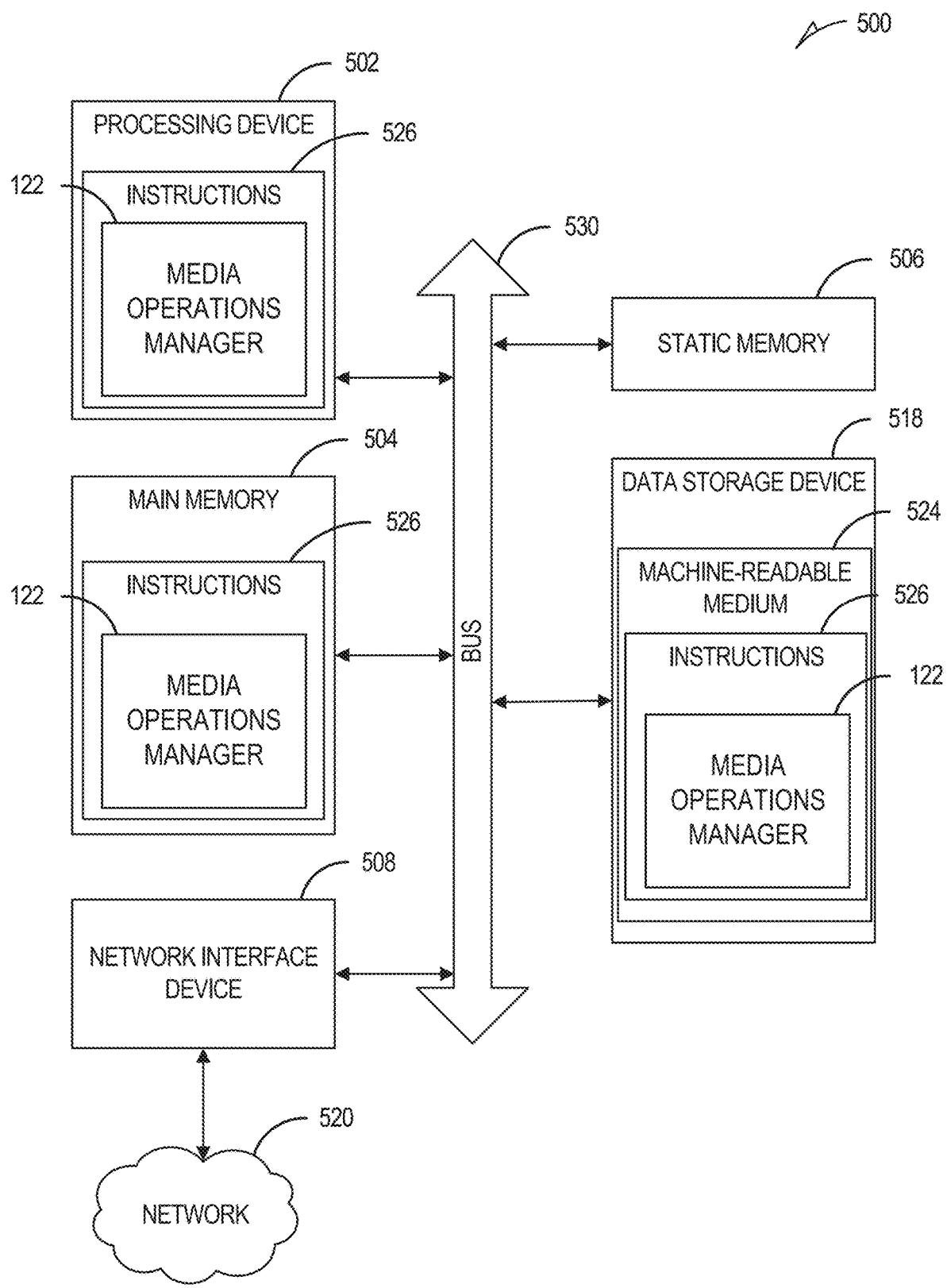
FIG. 5 is a block diagram illustrating a diagrammatic representation of a machine in the form of a computer system within which a set of instructions can be executed for causing the machine to perform any one or more of the methodologies discussed herein, in accordance with some examples of the present disclosure.

FIG. 5 illustrates an example machine in the form of a computer system 500 within which a set of instructions can be executed for causing the machine to perform any one or more of the methodologies discussed herein. In some examples, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the media operations manager 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), a network processor, or the like. The processing device 502 is configured to execute instructions 526 for performing the operations and steps discussed herein. The computer system 500 can further include a network interface device 508 to communicate over a network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one example, the instructions 526 implement functionality corresponding to the media operations manager 122 of FIG. 1. While the machine-readable storage medium 524 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, the disclosure has been described with reference to specific examples thereof. It will be evident that various modifications can be made thereto without departing from the broader scope of the disclosure as set forth in the following claims. The specification and drawings are, accordingly, to be regarded in an illustrative sense rather than a restrictive sense.

What is claimed is:

1. A system comprising:
a set of memory components of a memory sub-system; and
at least one processing device operatively coupled to the set of memory components, the at least one processing device programmed to perform operations comprising:
receiving a request to store a set of data to the set of memory components;
determining whether the set of data corresponds to either sequential data or random data;
selecting a write cursor from a plurality of write cursors to associate with the set of data based on determining whether the set of data corresponds to either the sequential data or the random data, a first write cursor of the plurality of write cursors storing a collection of data in a first queue having a first size before programming the collection of data on one or more of the set of memory components, and a second write cursor of the plurality of write cursors storing a second collection of data in a second queue having a second size before programming the second collection of data on the one or more of the set of memory components, the second size being smaller than the first size; and programming the set of data to the one or more of the set of memory components according to a data layout associated with the selected write cursor.

2. The system of claim 1, wherein the first write cursor of the plurality of write cursors corresponds to a first data layout, and wherein the second write cursor of the plurality of write cursors corresponds to a second data layout.

3. The system of claim 2, wherein the first write cursor is selected in response to determining that the set of data corresponds to the sequential data, and wherein the second write cursor is selected in response to determining that the set of data corresponds to the random data.

4. The system of claim 1, wherein the operations comprise:
determining that an amount of data in the collection of data stored in the first queue corresponds to the first size; and
in response to determining that the amount of data in the collection of data stored in the first queue corresponds to the first size, programming the collection of data on multiple planes sequentially across multiple dies of the set of memory components.

5. The system of claim 4, wherein the operations comprise:
dividing the collection of data for programming on the multiple planes such that a first row of the multiple planes across the multiple dies stores a first set of individual portions of the collection of data in sequence and a second row of the multiple planes across the multiple dies stores a second set of individual portions of the collection of data in sequence.

6. The system of claim 5, wherein a first portion of the second set of individual portions that is stored in a first plane of a first die of the multiple dies follows sequentially a second portion of the first set of individual portions that is stored in a last plane of a second die of the multiple dies.

7. The system of claim 6, wherein a first group of data of the collection of data is stored in a plurality of rows across planes of the first die in parallel followed by storage, in parallel, of a second group of data of the collection of data in a plurality of rows across planes of the second die.

8. The system of claim 1, wherein the collection of data stored in the first queue includes data from multiple threads comprising different sequences of data.

9. The system of claim 1, wherein the operations comprise:
determining that an amount of data in the collection of data stored in the first queue fails to correspond to the first size;
computing an amount of time that one or more portions of the collection of data have been stored in the first queue;
determining that the amount of time transgresses a maximum amount of time threshold;
in response to determining that the amount of time transgresses the maximum amount of time threshold, padding the collection of data to match the first size; and
in response to determining that the amount of data in the collection of data that has been padded corresponds to the first size, programming the collection of data on multiple planes sequentially across multiple dies of the set of memory components.

10. The system of claim 1, wherein the operations comprise:
determining that an amount of data in the second collection of data stored in the second queue corresponds to the second size; and
in response to determining that the amount of data in the second collection of data stored in the second queue corresponds to the second size, programming the second collection of data on multiple planes sequentially across a single die of the set of memory components.

11. The system of claim 10, wherein the operations comprise:
dividing the second collection of data for programming on the multiple planes such that a first row of the multiple planes across the single die stores a first set of individual portions of the second collection of data in sequence and a second row of the multiple planes across the single die stores a second set of individual portions of the collection of data in sequence.

12. The system of claim 11, wherein a first portion of the second set of individual portions that is stored in a first plane of the single die follows sequentially a second portion of the first set of individual portions that is stored in a last plane of the single die.

13. The system of claim 1, wherein the operations comprise:
performing garbage collection on the set of data using an individual write cursor corresponding to a random data layout.

14. The system of claim 1, wherein the operations comprise:
accessing configuration information associated with the set of memory components, the configuration information indicating a first data layout for the sequential data and a second data layout for the random data.

15. The system of claim 14, wherein the configuration information for the first data and second data layouts specifies a quantity of planes and quantity of dies across which to program the sequential and random data in sequence.

16. A method comprising:
receiving a request to store a set of data to a set of memory components;
determining whether the set of data corresponds to either sequential data or random data;
selecting a write cursor from a plurality of write cursors to associate with the set of data based on determining whether the set of data corresponds to either the sequential data or the random data, a first write cursor of the plurality of write cursors storing a collection of data in a first queue having a first size before programming the collection of data on one or more of the set of memory components, and a second write cursor of the plurality of write cursors storing a second collection of data in a second queue having a second size before programming the second collection of data on the one or more of the set of memory components, the second size being smaller than the first size; and
programming the set of data to the one or more of the set of memory components according to a data layout associated with the selected write cursor.

17. The method of claim 16, wherein the first write cursor of the plurality of write cursors corresponds to a first data layout, and wherein the second write cursor of the plurality of write cursors corresponds to a second data layout.

18. The method of claim 17, wherein the first write cursor is selected in response to determining that the set of data corresponds to the sequential data, and wherein the second write cursor is selected in response to determining that the set of data corresponds to the random data.

19. A non-transitory computer-readable storage medium comprising instructions that, when executed by at least one processing device, cause the at least one processing device to perform operations comprising:
  receiving a request to store a set of data to a set of memory components;
  determining whether the set of data corresponds to either sequential data or random data;
  selecting a write cursor from a plurality of write cursors to associate with the set of data based on determining whether the set of data corresponds to either the sequential data or the random data, a first write cursor of the plurality of write cursors storing a collection of data in a first queue having a first size before programming the collection of data on one or more of the set of memory components, and a second write cursor of the plurality of write cursors storing a second collection of data in a second queue having a second size before programming the second collection of data on the one or more of the set of memory components, the second size being smaller than the first size; and
  programming the set of data to the one or more of the set of memory components according to a data layout associated with the selected write cursor.

20. The non-transitory computer-readable storage medium of claim 19, wherein the first write cursor of the plurality of write cursors corresponds to a first data layout, and wherein the second write cursor of the plurality of write cursors corresponds to a second data layout.

* * * * *